United States Patent [19]
Schneider

[11] Patent Number: 6,131,812
[45] Date of Patent: Oct. 17, 2000

[54] APPLIANCE DOOR WITH INTEGRATED COMPUTER MEANS

[76] Inventor: Gerald P. Schneider, 8631 Hickory Dr., Philadelphia, Pa. 19136

[21] Appl. No.: 09/005,968

[22] Filed: Jan. 12, 1998

[51] Int. Cl.[7] ............................. G06K 5/00; G06K 17/60; G06F 17/00
[52] U.S. Cl. ......................... 235/385; 235/375; 235/380
[58] Field of Search .................................... 235/385, 375, 235/380

[56] References Cited

U.S. PATENT DOCUMENTS

| | | | |
|---|---|---|---|
| 4,405,991 | 9/1983 | Stanley | 364/715 |
| 4,463,348 | 7/1984 | Sidebottom | 340/585 |
| 4,807,169 | 2/1989 | Overbeck | 364/715.01 |
| 4,961,533 | 10/1990 | Teller et al. | 177/25.19 |
| 5,147,068 | 9/1992 | Wright | 221/9 |
| 5,285,041 | 2/1994 | Wright | 219/717 |
| 5,335,509 | 8/1994 | Namisniak et al. | 62/125 |
| 5,478,989 | 12/1995 | Shepley | 235/375 |
| 5,487,276 | 1/1996 | Namisniak et al. | 62/125 |
| 5,691,684 | 11/1997 | Murrah | 235/385 |
| 5,798,694 | 8/1998 | Reber et al. | 340/540 |

*Primary Examiner*—Donald Hajec
*Assistant Examiner*—Douglas X. Rodriguez
*Attorney, Agent, or Firm*—Volpe and Koenig, P.C.

[57] ABSTRACT

The present invention concerns an appliance door that incorporates a monitor and display system for tracking the inventory and use of consumer goods. The device includes a microprocessor having a memory that stores product specific information regarding the consumer goods, and is capable of receiving additional information regarding the same. The device maintains an inventory of the goods and will provide a display or hard copy of that inventory. In addition to maintaining inventories, the device may be programed to include information regarding the interaction of consumables with medications to alert the user to possible adverse reactions between them. The device preferably includes equipment for scanning the symbologies commonly associated with consumer goods.

11 Claims, 3 Drawing Sheets

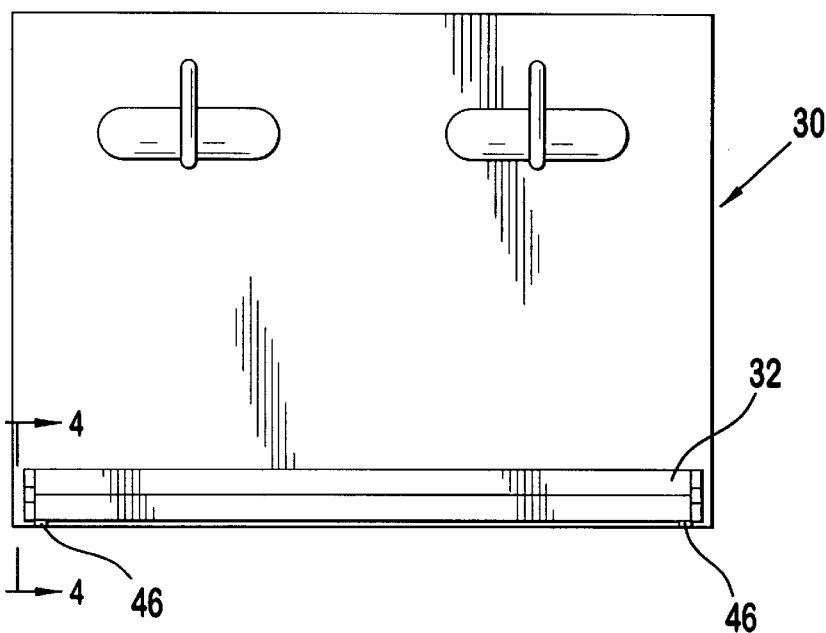
FIG. 3
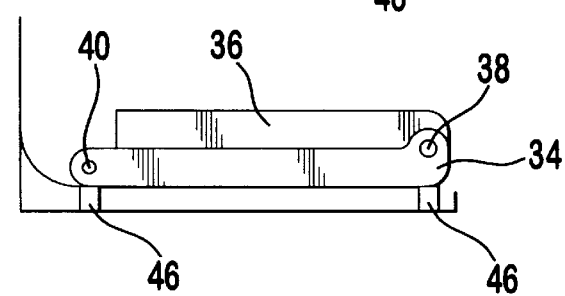
FIG. 4
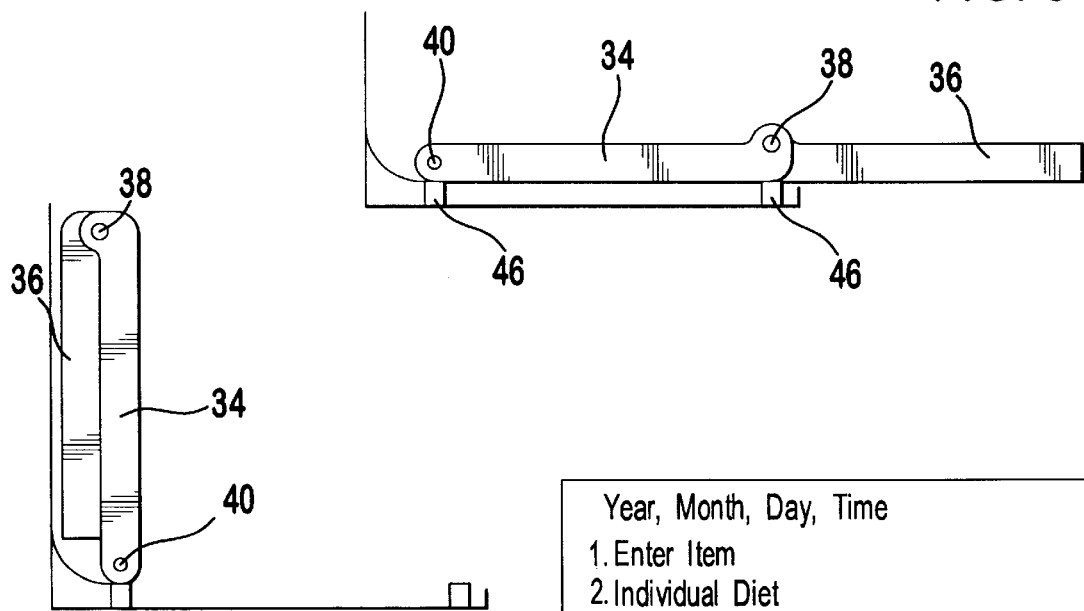
FIG. 5
FIG. 6
```
 Year, Month, Day, Time
1. Enter Item
2. Individual Diet
3. Inventory Goods
4. Medications
```
FIG. 7

6,131,812

APPLIANCE DOOR WITH INTEGRATED COMPUTER MEANS

BACKGROUND OF INVENTION

1. Field of the Invention

The present invention relates to a device for monitoring data on consumable goods. More particularly, the present invention relates to a device for monitoring the consumption, life span and nutritional value of various foods and related items.

2. Description of the Prior Art

In this ever increasingly fast-paced world, it is becoming more and more difficult for households to keep track of the amount of food in the home, the shelf life of the food, and the food consumed by individual household members. U.S. Pat. Nos. 5,335,509 and 5,487,276 disclose systems which monitor the expiration dates of various products and provide an alert when a product is close to its expiration date. However, these systems require an extensive amount of user input. Furthermore, these systems do not provide any information regarding the quantity of each product that remains or the nutritional information for the food that is consumed.

Accordingly, there is a need for a device which can efficiently monitor the quantity and life span of food and related products in a household and can also monitor caloric and nutritional intake for individual household members.

SUMMARY OF THE INVENTION

The present invention relates to an appliance door incorporating a monitor and display system. The system includes a microprocessor with memory means for storing information about consumer goods and individual users. Various means are associated with the microprocessor for inputting information regarding the consumer goods, including nutritional information, and individual user identifiers. An individual user can enter his or her identifier and an associated amount of goods consumed by the individual. The system computes and stores nutritional information related to the goods consumed by each individual user. The information can be displayed. A printer may also be provided for outputting the information.

BRIEF DESCRIPTION OF THE DRAWINGS

FIG. 3 is a front elevation view of the preferred scale assembly of the present invention.

FIG. 4 is a side elevation view of the scale assembly taken along the lines 4—4 in FIG. 3.

FIG. 5 is a side elevation view of the scale assembly, as shown in FIG. 4, with the extension member extended.

FIG. 6 is a side elevation view of the scale assembly, as shown in FIG. 4, in a cleaning position.

FIG. 7 shows the screen displaying an exemplary main menu.

DESCRIPTION OF THE PREFERRED EMBODIMENTS

Figure 1:
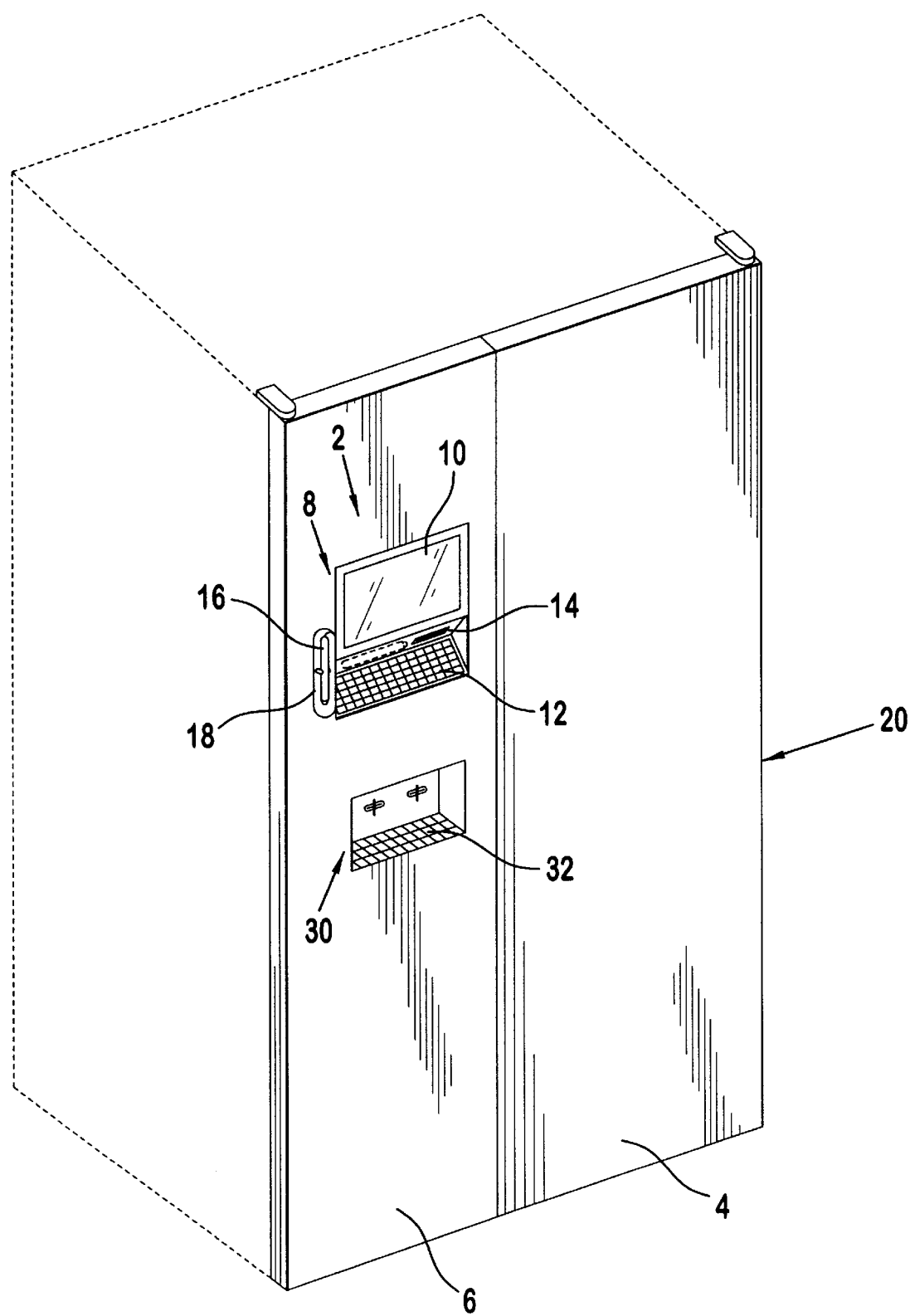
FIG. 1 is a partial isometric view of a refrigerator door incorporating the present invention.

The preferred embodiment will be described with reference to the drawing figures where like numerals represent like elements throughout.

Figure 2:
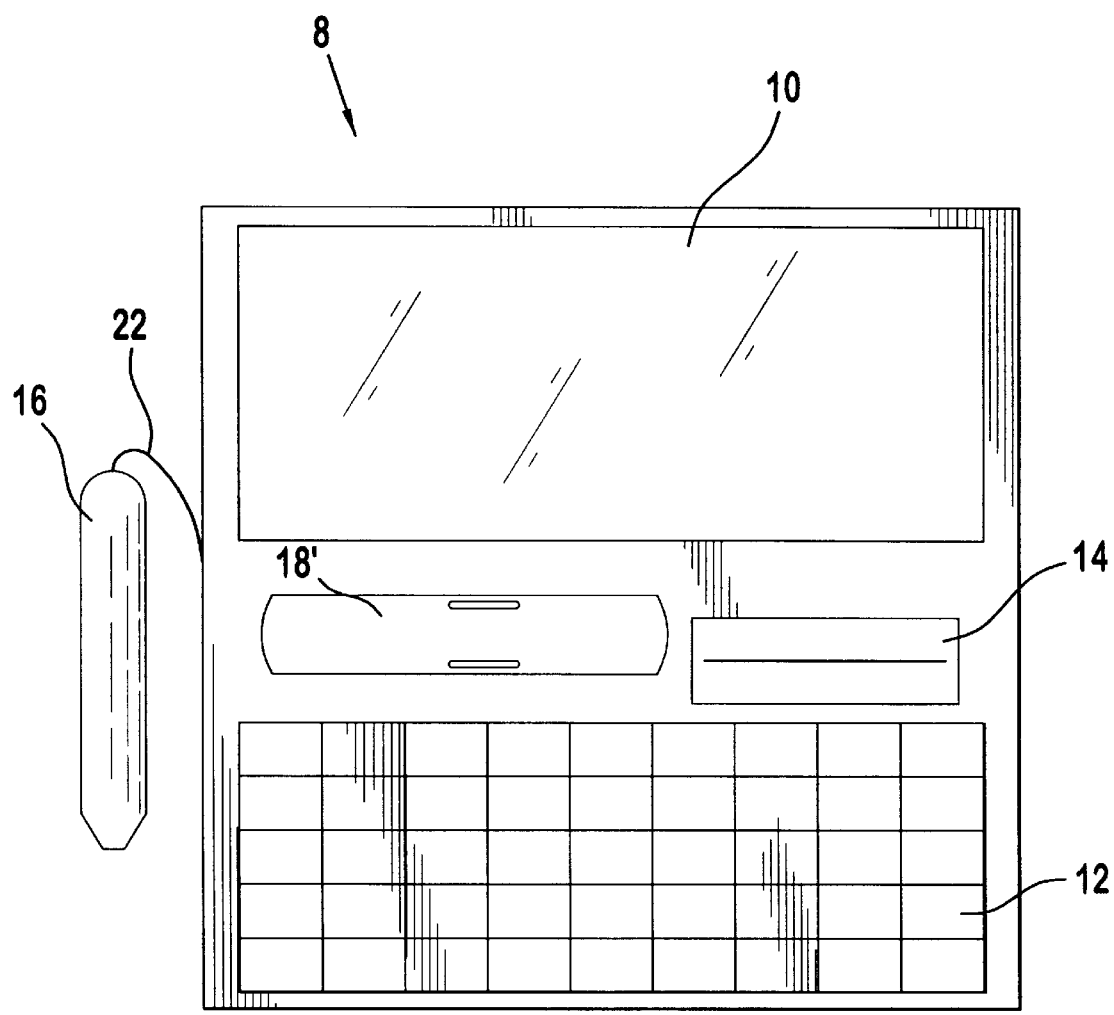
FIG. 2 is a front elevation view of the input/output (I/O) center of the present invention.

The device 2 of the present invention generally includes a processor assembly 50, an input/output (I/O) center 8 and an associated scale assembly 32 which are integrated into the refrigerator door 20. The processor assembly 50 generally comprises a microprocessor 52 will be described hereinafter. The I/O center 8, as shown in FIG. 2, generally comprises a visual display 10, a keyboard 12, a printer 14 and a scanning wand or pen 16. The device 2 is normally powered by the host appliance, however, it is preferred that a back-up battery be supplied as a safe guard against power interruptions.

The video screen 10 is preferably a flat screen of the type commonly used with lap top computers. The screen 10 displays menus which prompt the user and also provides output requested by the user. Alternatively, the screen 10 could be a touch screen. In this case, the keyboard 12 may not be required. The printer 14 is a standard small printer of the type frequently used with cash register receipts which allows the user to print desired information.

The keyboard 12 and pen 16 allow the user to input information into the device 2. The keyboard 12 can be provided in various configurations including alpha-numeric characters, directional movement keys and command keys. The keyboard 12 is preferably fixed in the device. Alternatively, the keyboard can be connected to the device 2 through a cord (not shown) or can be provided with remote access capability. The pen 16 is preferably connected to the device 2 through the cord 22. Recess 18 is provided to secure the pen 16 adjacent to the I/O center 8. The pen 16 is preferably used to read UPC bar codes or other symbologies commonly used in the labeling of consumer goods.

A scale assembly 32 is provided in communication with the device 2. In the preferred embodiment, the scale assembly 32 is provided as part of the refrigerator 20 ice and water dispenser 30. The ice and water assembly drainage shelf 34 is positioned on load cells 46 which communicate with the microprocessor assembly 52. An object to be weighed is placed on the shelf 34 and the load cells communicate the weight to the microprocessor 52. To accommodate larger objects, the shelf 34 is preferably provided with an extension member 36 which is pivotably connected at the outer edge of the shelf 34 by pivot pins 38. The extension member 36 is extended forward of the refrigerator door to allow taller and wider objects to be placed thereon. To facilitate cleaning, the shelf 34 and extension member 36 are pivoted upwardly as shown in FIG. 6. In the event that there is no drainage shelf 34 available, the weighing function may be provided through a peripheral scale which is connected to the computer or the information may be transferred via keyboard 12.

As shown in FIG. 7, the screen 10 shows a default screen including the date, time and main menu. The main menu allows the user to select various options quickly by using the selected function on the keyboard 12. These program selection techniques will be familiar to individuals who have used personal computers.

It is contemplated that the principal means of entering data about the food stuffs will be the use of the UPC bar code which is commonly found on packaged products. This data will generally be entered by swiping the light pen across the bar code on the product. Alternatively, the product number which is generally printed directly below the bar code may be entered into memory through the keyboard. In most instances, the UPC code will contain information about the size and quantity of the product but will not contain nutritional information. In those cases where the nutritional information is not provided, the data may need to be entered through the keyboard 12.

In those instances where the products being stored are not an original package, the UPC code on the original package may be scanned and the quantity data modified through use of the keyboard 12. In the event that the quantity is not critical to the information, the UPC code from the original package may be copied and applied to the package through self stick labels or other means. When the item identifier is the product's UPC code the microprocessor will compare it's code with the stored codes to update the inventory. Through the use of codes, the microprocessor will be able to determine what the food product is, the current inventory and, when entered, the nutritional information regarding each portion per serving.

Each time a product is presented to the system, the user will be prompted to enter any relevant expiration date together with any relevant storage data. Obviously, some products will not have an expiration date, however, it may still be desirable to know the date on which the product was first entered into the system for historical data to determine the rate at which the product is used.

If an original bar code is not available for scanning, the user can type in an identifier, for example, "p e a s". The screen 10 will then prompt the user to enter the weight quantity, expiration date, caloric information, and location in which the item is stored. The microprocessor can maintain all of this information, regarding the quantity, location, and expiration date of stored products to be utilized by the user through the main menu and the other options.

The processor assembly 50 with microprocessor 52 is preferably about the size of currently available lap top computers. Many of these devices are extremely powerful computing devices and contain substantial memory. Accordingly, the microprocessor 52 will have the memory capacity to retain basic, product specific nutritional information about consumables, and to be programed with the symbologies and decoding logic necessary for reading those symbologies commonly associated with consumer goods. While it is possible to incorporate a drive means into the microprocessor for loading data into the memory, it is currently preferred that the drive means be a peripheral device in order to save appliance space. It is also contemplated that the device would be pre-loaded with common software and information, such as the codes and nutritional information, prior to sale.

As can be seen from the above, the present device will provide a user with a readily available means of imputing data regarding food stuffs and medications at an convenient location and will provide a convenient means for determining the consumption of the same. For instance, the user may determine that four portions of a particular product are desired for a particular meal. Through the use of the nutritional information, the user can determine the weight amount of product which is equivalent to four portions. The scale assembly 32 is then used to measure the proper portions of product. This procedure can be followed for each item which forms part of the meal. The nutritional information can then be collected, totaled and divided among the four individuals. The nutritional information may be maintained individually or collectively for those meals which are shared equally.

In the event that the user consumes takeout food or food which is not prepared in the home, this information may added through the UPC code or the keyboard. However, it may be more difficult to track nutritional information for fast food items which often are not as fully described. In response to this concern, it is contemplated that the processor memory will include approximated nutritional food values for generally consumed foods and treats so that the values may be selected and entered by an associated code which can be found by scrolling through a list display on screen 10.

In the event that a user is taking medications which may have an adverse reaction based on certain food stuffs, those food stuffs may be identified on that user's record and the program will scan the nutritional information of entered food stuffs to determine if such potentially adverse acting ingredients are present.

If an individual wants to enter food consumed or added, the individual will select the appropriate record and will then enter the food items and the amount thereof. The item can be entered either through the keyboard or by swiping the pen 16 over a code. The microprocessor 52 will update the individual record and track the additions to or deletions from the total inventory. This allows the microprocessor to keep a current inventory and to determine the rate at which products are used and when they are running low. Based on the user's input as to desired inventory levels, the microprocessor will determine when the inventory is low and store a notation of the same in a shopping list memory.

To find out the items on the shopping list, the user simply polls the inventory program. The user can then choose among a summary of input, a total inventory, a shopping list, or a history for product use. The summary of input would allow a user to track all the items entered. This information could be displayed on the screen or printed out in hard format. The inventory function would allow the user to display or print out the complete history of products stored in the system. Finally, the product life option will allow the individual to enter an item identifier, either with the light pen 16 or the keyboard 12, to determine the length of time it has been stored which will be displayed on the screen 10 or printed with the printer 14.

The main menu also gives the user the option of storing medication information. Upon selection of this option, the user will be prompted to enter a name. The user can then enter the name(s) of the medication(s), the frequency of use, the dosage times and rates and any special instructions, such take with food. Each time a medication is due, the system 2 will cause a indicator to flash on the screen 10. An audio signal can also be produced. The processor memory may also store medical information for use in alerting the user if a potentially harmful combination of medicines has been entered.

In addition to maintaining food and medical information, incorporation of the present invention into the appliance will permit the user to control the appliance features directly from the device 2. For instance, temperature, absolute humidity, defrost cycles and relative humidity may be monitored and adjusted without the need for opening the appliance door. Accordingly, the condition which is being adjusted will not be influenced by exposure to ambient conditions outside of the appliance. An additional advantage which is believed to stem from incorporation of the device directly into the appliance is the ability to generate a prompt or alert signal from the device when the appliance door is open. Through the use of such a prompt, the user will be reminded of the need to update the system information based on that use of the appliance.

It will be understood that the user will be free to assign different degrees of the importance to the various functions and that the usefulness of the invention will be influenced by the accuracy of the information.

What is claimed is:

1. An appliance door incorporating a monitor and display system comprising:

a microprocessor including memory means that stores information about consumer goods and individual users, a means associated with the microprocessor for inputting information regarding the consumer goods, including nutritional information, aid individual user identifiers;

a means for inputting an individual user identifier and an associated amount of goods consumed by the identified individual user, the means for inputting an amount of goods consumed by an individual user including means for weighing goods and inputting that information to the microprocessor;

a means for computing and storing nutritional information related to the goods consumed by each individual user; and a display means responsive to the microprocessor for outputting stored information in a human readable form.

2. The device of claim 1 further comprising a means for printing information in a human readable form.

3. The device of claim 1 wherein the means for inputting information includes a scanning device.

4. The device of claim 1 wherein the means for inputting information includes a keyboard.

5. The device of claim 1 wherein the microprocessor includes means for decoding coded symbologies used in association with consumables and the device includes means for scanning the symbologies.

6. The device of claim 1 wherein the means for weighing goods includes at least one load cell positioned under an ice and water drainage shelf positioned on the appliance door and in communication with the microprocessor whereby goods are placed on the shelf to input the weight thereof.

7. The device of claim 1 further comprising means for inputting information relating to medications of an identified individual user.

8. The device of claim 7 further comprising means for reviewing medication information for an identified individual user to confirm that the individual user is not taking a harmful combination of medications.

9. The device of claim 7 further comprising means for comparing information related to an identified individual user's medication and consumed goods to determine whether the combination thereof is potentially harmful.

10. The device of claim 7 further comprising means for emitting a signal when medication is due for an individual user.

11. An appliance door incorporating a monitor and display system comprising:

a microprocessor including memory means, means associated with the microprocessor for inputting information regarding consumer goods;

means for identifying and weighing goods to be consumed by an individual user, the weighing means including at least one load cell in communication with the microprocessor and positioned under an ice and water drainage shelf positioned on the appliance door;

a means for computing and storing nutritional information related to the goods consumed by each individual user whereby the individual user can maintain a record of theidentification and amount of goods consumed.

* * * * *

UNITED STATES PATENT AND TRADEMARK OFFICE
CERTIFICATE OF CORRECTION

PATENT NO. : 6,131,812
DATED : October 17, 2000
INVENTOR(S) : Gerald P. Schneider It is certified that error appears in the above-identified patent and that said Letters Patent is hereby corrected as shown below:

In claim 1, at column 5, line 11, delete "aid" and insert --and-- therefor.

Signed and Sealed this

Eighth Day of May, 2001

Attest:

NICHOLAS P. GODICI

Attesting Officer

Acting Director of the United States Patent and Trademark Office